United States Patent [19]

Delgado

[11] Patent Number: 4,942,993
[45] Date of Patent: Jul. 24, 1990

[54] VEHICLE SEAT STORAGE APPARATUS

[76] Inventor: Kenneth L. Delgado, 1318 Susan Ave., Redlands, Calif. 92374

[21] Appl. No.: 208,471

[22] Filed: Jun. 20, 1988

[51] Int. Cl.$^5$ .............................................. B60R 11/06
[52] U.S. Cl. ..................................... 224/275; 224/277; 224/42.45 R
[58] Field of Search ................. 224/275, 277, 42.42 R, 224/42.45 R, 915, 42.46 B, 42.43, 42.44, 42.46 R; 296/37.15, 37.16; 297/191, 188; 248/316.7, 302, 500, 503

[56] References Cited

U.S. PATENT DOCUMENTS

| | | | |
|---|---|---|---|
| 1,358,041 | 11/1920 | Vetter | 296/37.15 |
| 1,476,993 | 12/1923 | McQuinn | 224/42.43 X |
| 2,008,372 | 7/1935 | Tipson | 224/275 |
| 2,640,595 | 6/1953 | Byford | 211/74 |
| 2,767,895 | 10/1956 | Smith | 224/275 |
| 2,784,889 | 3/1957 | Kennedy | 224/275 |
| 2,834,566 | 5/1958 | Bower | 224/42.45 R |
| 2,853,219 | 9/1958 | Schwartz | 224/275 |
| 2,962,198 | 11/1960 | Bell | 224/275 |
| 3,372,896 | 3/1968 | Myers et al. | 224/42.42 R |
| 3,465,930 | 9/1969 | Croix | 224/42.43 X |
| 3,635,381 | 1/1972 | Hensley | 248/302 X |
| 3,690,446 | 9/1972 | Spainhour et al. | 224/275 X |
| 3,827,664 | 8/1974 | Larson | 224/42.45 R X |
| 3,987,946 | 10/1976 | Haglöf | 224/42.46 B X |
| 4,300,709 | 11/1981 | Page, Jr. | 224/42.42 R X |
| 4,351,505 | 9/1982 | Wickersham | 248/316.7 |
| 4,375,268 | 3/1983 | Speck | 224/42.45 R |

Primary Examiner—Renee S. Luebke
Attorney, Agent, or Firm—Sheldon & Mak

[57] ABSTRACT

A holder for carrying an object such as a folded cardboard sunshade has a pair of upwardly facing U-shaped members for gripping the object, and a forwardly extending anchor member for supportively inserting into an openable passage between a vehicle seat cushion and back member. The object is thus carried behind the seat, out of the way and safely above the floor of vehicle. The U-shaped members are formed of a high strength elastic plastic material, while the anchor member is made of a more pliable material such as rubber. A rigid connection between these two materials is obtained by head members on the U-shaped members, the head members interlocking with corresponding cavities formed in upstanding leg members of the anchor member.

13 Claims, 1 Drawing Sheet

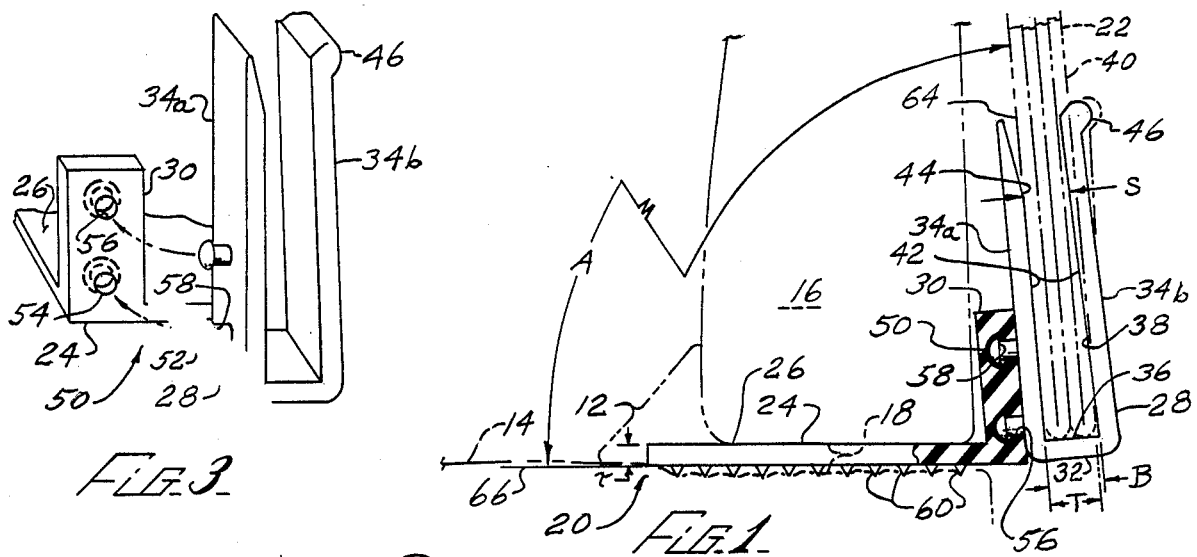
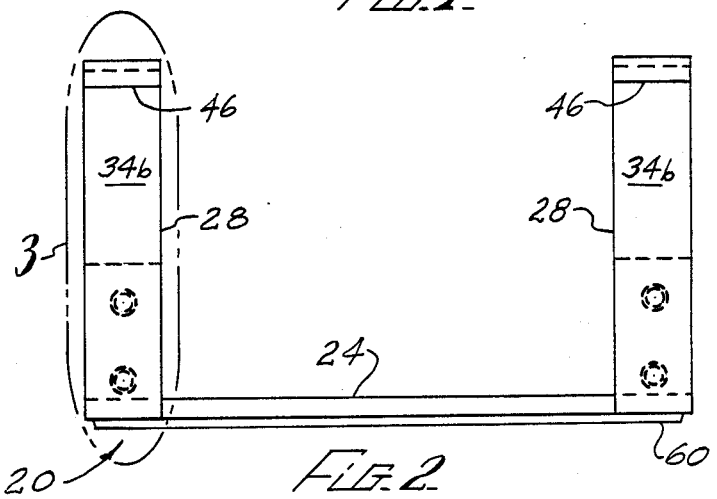
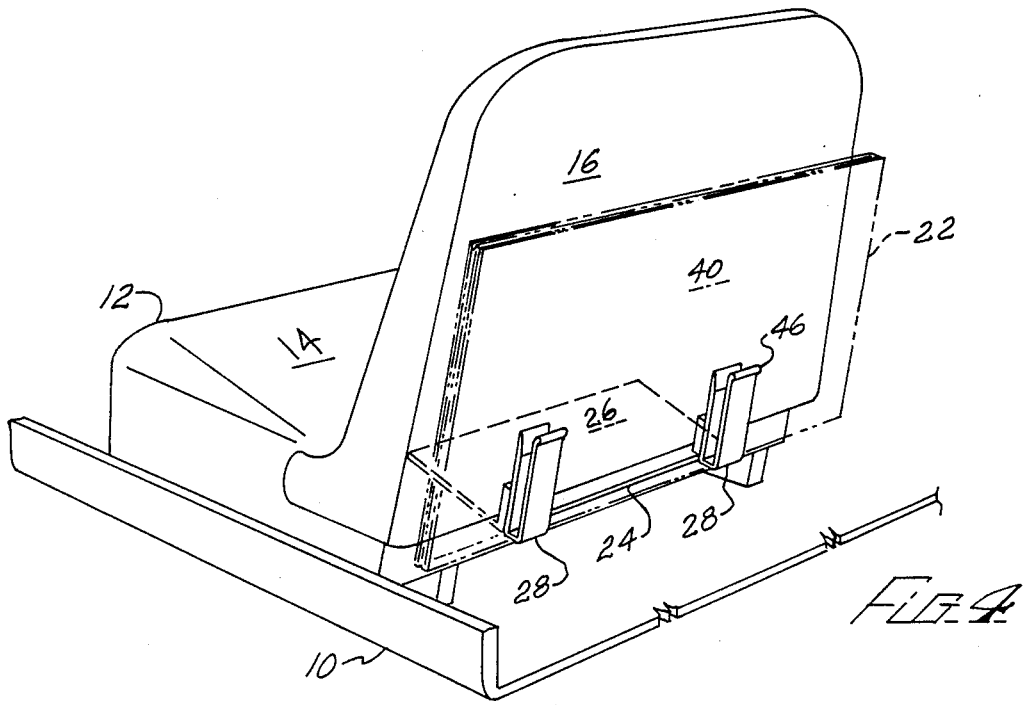

VEHICLE SEAT STORAGE APPARATUS

BACKGROUND

The present invention relates to vehicle accessories and more importantly to storage racks for carrying objects in vehicles.

A common practice is to store objects such as cardboard sunshades and other bulky items behind the front seat of a car. This practice is disadvantageous in that the objects can get lost or damaged by migrations under the seat, they can be damaged by the feet of rear passengers of the vehicle, and they can be damaged by water that can sometimes seep onto the floor. Moreover, many such objects are awkward to retrieve from the floor.

It is known to provide storage holders and racks for use either on or behind vehicle seats. For example, holders for containers which can rest on the seat cushion and be retained between the seat and the back are disclosed in U.S. Pat. Nos. 2,640,595 to Byford, 2,962,198 to Bell, and 2,784,889 to Kennedy. Also, racks that hang behind the seat from the top of the seat back are disclosed in U.S. Pat. Nos. 2,767,895 to Smith and 2,853,219 to Schwartz. Further, racks that are supported on the floor behind the seat are disclosed in U.S. Pat. Nos. 1,358,041 to Vetter and 2,008,372 to Tipson.

The storage holders and racks of the prior art exhibit one or more of the following disadvantages:

1. They are not suitable for storing cardboard sunshades in that the sunshade, even when folded, would not fit therein;
2. They are large and bulky, and thus difficult to store when not in use;
3. They are expensive to manufacture, being large and of complex construction.

Thus there is a need for a storage carrier for vehicles that provides convenient storage of bulky objects such as cardboard sunshades, that is easy to use and inexpensive to manufacture.

SUMMARY

The present invention meets this need by providing a storage carrier apparatus that is supported from the rear of a vehicle seat in an openable passage between the seat cushion and the back of the seat. The apparatus includes an anchor member for inserting forwardly into the passage, a support member connected to the anchor member and extending rearwardly behind the seat, and a retainer member extending upwardly from the rear of the support member. An object to be stored is thus supported on the support member and retained proximate the back member by the retainer member. The anchor member can include a plate member, the plate member preferably having at least one protuberance extending therefrom for gripping the seat.

Preferably the apparatus also includes a U-shaped member connected to the anchor member and having a base member and a pair of upstanding leg members, one of the leg members forming the retaining member, the base member forming the support member. Thus an object such as a folded cardboard sunshade can be conveniently retained between the legs of the U-shaped member. There can be two of the U-shaped members spaced apart at opposite sides of the anchor member for enhancing the stability of the object. The anchor member can have a front portion and a substantially vertically extending leg portion to which the U-shaped member is rigidly attached. Also, the front portion of the anchor member can form a flexible plate member. The anchor member can be formed of polyurethane rubber.

The leg portion of the anchor can be formed to include a socket cavity, the U-shaped member including a head member for fixedly engaging the cavity, thereby effecting the rigid attachment of the U-shaped member to the anchor member at particularly low cost while permitting the anchor member and the U-shaped member to be formed of widely dissimilar materials. The U-shaped member can be formed of an acrylic plastic.

Preferably the front surface of the retainer member and the anchor member form intersecting retainer and seat planes such that the upward extension of the retainer plane and the forward extension of the seat plane form an inclination angle of between about 75° and about 90° for locating the top of the object proximate the seat back of a typical seat wherein the angle between the passage and the back of the seat is less than 90° with the apparatus in use. More preferably, the angle is about 85°.

Preferably the U-shaped member is adapted for retaining the object in a folded condition between the leg members. The upper portion of the U-shaped member preferably forms a tapered opening for compressing folds of the object as the object is lowered into the U-shaped member. More preferably, the leg members between the tapered opening form a tapered cavity between the tapered opening and the base member whereby the object is biasingly gripped between the leg members. Still more preferably, the spacing between the leg members proximate the base is greater than a folded thickness of the object, while the spacing at the opening is less than the thickness of the object.

DRAWINGS

These and other features, aspects, and advantages of the present invention will become better understood with reference to the following description, appended claims, and accompanying drawings where:

FIG. 1 is a fragmentary side sectional elevational view of apparatus according to the present invention, the apparatus holding a folded object and being supported between a vehicle seat cushion and its back;

FIG. 2 is a rear elevational view of the apparatus of FIG. 1;

FIG. 3 is an exploded perspective detail view of the apparatus of FIG. 1 within region 3 of FIG. 2;

FIG. 4 is a rear oblique elevational perspective view of the apparatus of FIG. 1 showing the relationship of the object, the seat, and the vehicle.

DESCRIPTION

The present invention is directed to a vehicle seat storage apparatus that is particularly well suited for carrying a foldable paneled sunshade behind a seat of the vehicle. With reference to the drawings of FIGS. 1-4, a vehicle 10 includes a forward-facing seat 12, the seat 12 including a supportive cushion portion 14 and a back portion 16, the back portion 16 extending generally upwardly from proximate the rear of the cushion portion 14 such that an openable passage 18 is formed between the cushion portion 14 and the back portion 16.

According to the present invention, a storage apparatus 20 for carrying an object 22 behind the seat 12 is removably supported within the openable passage 18. The apparatus 20 includes an anchor member 24 having a front portion 26 for supportive engagement with the seat 12 in the passage 18 between the cushion portion 14 and the back portion 16. A pair of upwardly extending U-shaped members 28 are rigidly attached to the anchor member 24 at opposite sides thereof, the attachment being facilitated by upstanding leg members 30 that are formed at opposite rear corners of the anchor member 24. The U-shaped members 28 each include a base portion 32 and a pair of upwardly extending leg portions 34, designated front leg portion 34a and rear leg portion 34b in the drawings.

The apparatus 20 is adapted for supporting the object 22 between the leg portions 34 of one or both of the U-shaped members 28, one or both of the base portions 32 functioning as a support member 36 that extends rearwardly behind the seat 12 for supporting the object 22. Also, one or both of the rear leg portions 34b functions as a retainer member 38 for removably holding the object 22 proximate the back portion 16 of the seat 12.

The object 22, as stated above, can be a conventional foldable panelled sunshade 40, the apparatus 20 retaining the object 22 in a folded condition as shown in the drawings. As best shown in FIG. 1, the leg portions 34a and 34b are separated by a distance B at the base portion 32, the distance B being slightly greater than a corresponding compressed thickness T of the folded object 22. Also, the leg portions 34 are inclined toward each other for producing an inwardly tapered slot 42 for receiving the object 22, the slot 42 having an opening 44 whereat the leg portions 34 are spaced apart by a distance S, the distance S being nominally less than the compressed thickness T. Further, the U-shaped member 28 is formed for permitting elastic flexure thereof whereby the object 22 may be lowered into the slot 42 against inward bias of the leg portions 34, thereby providing frictional engagement between the object 22 and the U-shaped member 28. For facilitating the entry of the object 22 into the slot 42, the front leg portion 34a has a ramp portion 45 that is tapered away from the rear leg portion 34b above the opening 44.

A rounded head member 46 projects upwardly and outwardly from the upper extremity of the rear leg portion 34b for further facilitating the insertion of the object 22 into the slot 42. More importantly, the head member 46 is smoothly contoured for avoiding injury to an occupant of the vehicle 10 in case of accidental contact with the apparatus 20. The U-shaped members 28 are formed of a high-strength elastic material such as an acrylic plastic. The anchor member 24, that is at least the front portion 26 thereof, is preferably formed of a more flexible material than the U-shaped members 28 for permitting the anchor member 24 to conform to the contours of the passage 18 as the seat 12 is variously loaded while in use. Accordingly, the anchor member 24 is preferably formed of a relatively flexible material such as polyurethane rubber. The front portion 26 of the anchor member 24 is formed in a mat or plate configuration having a thickness t that is sufficiently great to provide the necessary strength for supporting the object 22, yet not so great as to prevent some conformity with the slightly variable shape of the opening 18 or to require excessive separation between the cushion portion 14 and the back portion 16 for permiting insertion of the front portion 26 into the passage 18. For this purpose, a thickness t of between 0.2 and 0.3 inch have proven satisfactory. More preferably, the thickness t is approximately 0.25 inch.

In order to effect a rigid connection between the U-shaped member 28 and the anchor member 24, the apparatus 20 incorporates an interlocking fastening means 50 between the U-shaped member 28 and the leg members 30. As best shown in FIGS. 1 and 3, the fastening means 50 includes a pair of head members 52 extending from the front of the front leg portion 34a of the U-shaped member 28, the head members 52 engaging respective cavities 54 that are formed in the leg members 30. The leg member 30, being formed of the same relatively flexible material as the remainder of the anchor member 24, is capable of deforming sufficiently to accept the head member 52, a neck portion of 56 of each cavity 54 fixably engaging a shoulder portion 58 of each head member 52 upon full engagement of the head member 52 with its respective cavity 54. Thus the U-shaped members 28 can be quickly and easily attached rigidly to the anchor member 24 without the requirement of separate fasteners or the impractical bonding of dissimilar materials. Instead, assembly is effected by the simple expedient of pressing the parts together.

A plurality of tooth-shaped protuberances 60 are formed on the bottom of the anchor member 24 for maintaining the apparatus 20 in fixed relation to the seat 12 during use. By locating the protuberances 60 on one side only of the anchor member 24, the insertion of the front portion 26 thereof may be facilitated by the application of an upward force on the anchor member 24 as the front portion 26 thereof is being inserted into the passage 18. This is because the frictional forces between the relatively smooth upper side of the front portion 26 will not be increased as much by the application of the upward force as the friction between the bottom surface having the protuberances 60 is reduced by slight movement of the anchor member 24 away from the cushion portion 14. Once inserted, the stability of the anchor member 24 is enhanced by downward pressure exerted by the back portion 16 against the front portion 26 and by the weight of the object 22, when such is present.

For properly locating the object 22 proximate the back portion 16 of the seat 12, the leg members 30 of the anchor member 24 are inclined slightly forwardly from being perpendicular to the front portion 26 of the anchor member 24. More particularly, the leg members 30 are inclined such that an angle A between an upwardly extending object plane 64 and a forwardly extending seat plane 66 is not more than about 90° as shown in FIG. 1. The object plane 64 is defined by the U-shaped member 28 such that when the object 22 is inserted in the slot 42, the object plane 64 is coplanar with an outside surface of the object 22. Similarly, the seat plane 66 is defined by a bottom surface of the front portion 26 of the anchor member 24. It is anticipated that the seat plane 66, when the apparatus 20 is in use, will slope downwardly to the rear at least to the extent that the back surface of the back portion 16 slopes upwardly and rearwardly from the vertical. Thus in typical applications it is anticipated that the angle A should be preferably from about 75° to about 90°, more preferably from about 80° to about 85°.

The apparatus 20 thus provides a practical storage holder for the object 22, the object being conveniently located behind the seat 12 where it is readily accessible to a person entering or leaving the vehicle 10. The object 22 is not subject to damage by the feet of rear passengers of the vehicle, or by water that might get inside the vehicle. Further, when the object is the foldable sunshade 40, the apparatus 20 maintains the sunshade 40 in its folded condition. Moreover, the apparatus 20 is itself easily stored elsewhere when not in use in that the apparatus 20 is smaller than what it can carry. This is because the object 22 can extend, when carried, upwardly above the tops of the U-shaped members, as well as laterally beyond opposite sides of the apparatus 20.

Although the present invention has been described in considerable detail with reference to certain preferred versions thereof, other versions are possible. For example, the apparatus 20 can be a single molded part with appropriate reinforcements molded into the U-shaped members 34. Also, the front leg portions 34a can be omitted such that the object 22 is retained between the retainer members 38 and the back portion 16 of the seat 12. Therefore, the spirit and scope of the appended claims should not necessarily be limited to the description of the preferred versions thereof.

What is claimed is:

1. Apparatus for removably storing an object behind the seat of a vehicle, the seat having a seat member and a back member, an openable passage being formed between the seat member and the back member, the apparatus comprising:
   (a) an anchor member for inserting forwardly into the passage from behind the seat, the anchor member having a front portion, a substantially vertically extending leg portion at the rear of the front portion, and opposite side extremities, the anchor member being supported by engagement with the passage;
   (b) a support member connected to the anchor member, the support member extending rearwardly behind the seat for supporting the object;
   (c) a retainer member connected to the rear of the support member and extending upwardly therefrom for removably holding the object proximate the back member; and
   (d) a U-shaped member rigidly connected to the leg portion of the anchor member for receiving the object, the U-shaped member having a base member and a pair of upstanding leg members, one of the leg members forming the retainer member, the base member forming the support member.

2. The apparatus of claim 1 wherein the anchor member comprises a plate member, the plate member having at least one protuberance extending therefrom for gripping the seat.

3. The apparatus of claim 1 comprising a pair of the U-shaped members, the U-shaped members being spaced apart approximately in line with the opposite side extremities of the anchor member.

4. The apparatus of claim 1 wherein the front portion of the anchor member comprises a flexible plate member.

5. The apparatus of claim 1 wherein the anchor member is formed of polyurethane rubber.

6. The apparatus of claim 1 wherein the leg portion is formed to include a socket cavity, and the U-shaped member comprises a head member extending from a side of the U-shaped member for fixedly engaging the cavity.

7. The apparatus of claim 1 wherein the U-shaped member is formed from an acrylic plastic.

8. The apparatus of claim 1 wherein the front portion of the anchor member is substantially planar in a seat plane, the front surface of the retainer member defining a retainer plane above the support member, an inclination angle being formed between an upward extension of the retainer plane and a forward extension of the seat plane, the inclination angle being between about 75° and 90°.

9. The apparatus of claim 8 wherein the angle is from about 80° to about 85°.

10. Apparatus for removably storing an object having foldable panels in a folded condition behind the seat of a vehicle, the seat having a seat member and a back member, an openable passage being formed between the seat member and the back member, the apparatus comprising:
    (a) an anchor member for inserting forwardly into the passage from behind the seat, the anchor member having a front portion and opposite side extremities, the anchor member being supported by engagement with the passage;
    (b) a support member connected to the anchor member, the support member extending rearwardly behind the seat for supporting the object;
    (c) a retainer member connected to the rear of the support member and extending upwardly therefrom for removably holding the object proximate the back member; and
    (d) a U-shaped member connected to the anchor member for receiving the object, the U-shaped member having a base member and a pair of upstanding leg members, one of the leg members forming the retainer member, the base member forming the support member, the U-shaped member being adapted for receiving and supporting the object, the leg members retaining the object in the folded condition, an upper portion of the U-shaped member forming a tapered opening between the leg members for compressing folds of the object as the object is lowered into the U-shaped member.

11. The apparatus of claim 10 wherein the object in the folded condition has a thickness, and the leg members between the tapered opening and the base form a tapered cavity, the leg members being spaced apart a first distance proximate the opening and a second distance proximate the base, the second distance being greater than the first distance, whereby the object is biasingly gripped between the leg members.

12. The apparatus of claim 11 wherein the first distance is less than the thickness of the object and the second distance is greater than the thickness of the object.

13. Apparatus for removably storing a foldable paneled object behind the seat of a vehicle, the object when folded forming an object plane, the seat having a seat member and a back member, an openable passage being formed between the seat member and the back member, the apparatus comprising:
    (a) an anchor member for inserting forwardly into the passage from behind the seat, a front portion of the anchor member forming a flexible plate member, the plate member defining a seat plane and having at least one protuberance extending therefrom for gripping the seat;
    (b) a pair of spaced apart U-shaped members connected to the anchor member for receiving the object, each of the U-shaped members having a base member for supporting the object, and a pair of upstanding leg members, the leg members being adapted for gripping the object and retaining the object in a folded condition proximate the seat back;

(c) the leg members of each U-shaped member extending on opposite sides of a retainer plane corresponding to the object plane, an inclination angle being formed between an upward extension of the retainer plane and a forward extension of the seat plane, the inclination angle being between about 75° and 85°.

* * * * *